(12) United States Patent
Cepress et al.

(10) Patent No.: US 10,207,436 B2
(45) Date of Patent: *Feb. 19, 2019

(54) MOLDED POCKET IN TRANSACTION CARD CONSTRUCTION

(71) Applicant: CAPITAL ONE SERVICES, LLC, McLean, VA (US)

(72) Inventors: Carl Alexander Cepress, Mountain View, CA (US); Elwin Ching Yee Ong, San Francisco, CA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/870,936

(22) Filed: Jan. 13, 2018

(65) Prior Publication Data

US 2018/0133939 A1 May 17, 2018

Related U.S. Application Data

(63) Continuation of application No. 15/293,270, filed on Oct. 13, 2016.
(Continued)

(51) Int. Cl.
*B29C 45/00* (2006.01)
*B29C 45/14* (2006.01)
(Continued)

(52) U.S. Cl.
CPC .......... *B29C 45/0053* (2013.01); *B29C 33/12* (2013.01); *B29C 43/02* (2013.01);
(Continued)

(58) Field of Classification Search
CPC .......... B29C 45/0053; B29C 2043/181; B29C 43/18; B29C 33/12; B29C 45/14647;
(Continued)

(56) References Cited

U.S. PATENT DOCUMENTS

| | | | |
|---|---|---|---|
| 5,350,553 A * | 9/1994 | Glaser ............... | B29C 45/14008 264/132 |
| 5,417,905 A * | 5/1995 | Lemaire ............ | B29C 45/14647 257/E23.064 |

(Continued)

FOREIGN PATENT DOCUMENTS

| | | | | |
|---|---|---|---|---|
| DE | 202010006509 U1 * | 8/2010 | ............ | C09J 133/08 |
| JP | 08-39625 A | 2/1996 | | |

(Continued)

OTHER PUBLICATIONS

International Search Report and Written Opinion dated Jan. 12, 2017 for PCT/US2016/056870 filed Oct. 13, 2016 (7 pages).

*Primary Examiner* — Philip C Tucker
*Assistant Examiner* — Vicki Wu
(74) *Attorney, Agent, or Firm* — Finnegan, Henderson, Farabow, Garrett & Dunner LLP

(57) ABSTRACT

Methods and apparatuses are provided for manufacturing a transaction card. The disclosed methods and apparatuses may be used to form a transaction card frame within a mold. The transaction card frame may include one or more recessed portions formed within a first surface of the transaction card frame. The one or more recessed portions may be configured for affixing one or more electronic components.

21 Claims, 10 Drawing Sheets

Related U.S. Application Data

(60) Provisional application No. 62/241,636, filed on Oct. 14, 2015.

(51) Int. Cl.
   *B29C 43/02* (2006.01)
   *B29C 43/18* (2006.01)
   *B29C 43/36* (2006.01)
   *B29C 45/40* (2006.01)
   *B29C 45/27* (2006.01)
   *B29C 33/12* (2006.01)
   *B29C 43/50* (2006.01)
   *B29L 17/00* (2006.01)

(52) U.S. Cl.
   CPC .............. *B29C 43/18* (2013.01); *B29C 43/36* (2013.01); *B29C 45/14647* (2013.01); *B29C 45/27* (2013.01); *B29C 45/4005* (2013.01); *B29C 43/50* (2013.01); *B29C 2043/181* (2013.01); *B29C 2043/503* (2013.01); *B29L 2017/006* (2013.01)

(58) Field of Classification Search
   CPC ... B29C 43/50; B29C 2043/503; B29C 43/46; B29C 45/27; B29C 45/4005; B29C 43/02; B29L 2017/006
   USPC .......................................................... 156/245
   See application file for complete search history.

(56) References Cited

U.S. PATENT DOCUMENTS

| | | | | |
|---|---|---|---|---|
| 5,498,388 | A | * | 3/1996 | Kodai ............... B29C 45/14647 264/263 |
| 5,567,362 | A | | 10/1996 | Grun |
| 5,833,785 | A | * | 11/1998 | Centofante ............. B29C 65/08 156/292 |
| 6,027,328 | A | * | 2/2000 | Herbst ................ B29C 45/2803 264/161 |
| 7,140,540 | B2 | * | 11/2006 | Haddock .......... G06K 19/06009 235/380 |
| 7,237,724 | B2 | * | 7/2007 | Singleton ........... G06K 19/0702 235/488 |
| 2002/0132956 | A1 | * | 9/2002 | Matayoshi .......... C08L 23/0815 528/192 |
| 2003/0076662 | A1 | * | 4/2003 | Miehling ............... G06K 19/04 361/760 |
| 2005/0023583 | A1 | * | 2/2005 | Bolken ............... B29C 45/1418 257/295 |
| 2008/0067254 | A1 | | 3/2008 | Lee |
| 2017/0106572 | A1 | * | 4/2017 | Cepress ................ B29C 43/02 |

FOREIGN PATENT DOCUMENTS

| | | | |
|---|---|---|---|
| JP | 11042684 | A * | 2/1999 |
| WO | WO 03/096595 | A2 | 11/2003 |

* cited by examiner

MOLDED POCKET IN TRANSACTION CARD CONSTRUCTION

PRIORITY CLAIM

This application is a continuation of U.S. application Ser. No. 15/293,270, filed Oct. 13, 2016, which claims the benefit of U.S. provisional patent application No. 62/241,636, filed Oct. 14, 2015. The aforementioned applications are incorporated herein by reference in their entireties.

TECHNICAL FIELD

The disclosed embodiments generally relate to transaction card construction, and particularly, to molding a pocket into a transaction card.

BACKGROUND

Transaction cards, such as credit and debit cards, have increasingly become a primary means for customers to complete financial transactions. Typically, transaction cards are cut from laminated sheets of polyvinyl chloride (PVC) or polycarbonate (PC), or other similar materials. After the overall shape of the card is formed, the card may be modified to add functional and/or visual features. For example, a magnetic strip may be affixed to one side, the card may be stamped with the card number and customer name, and color or a design may be added for appearance.

Many transaction card providers are moving away from using magnetic strip technology and now additionally or alternatively include more advanced electronic components attached to or embedded within a transaction card. For example, some transaction cards include microchips (e.g., Europay, Mastercard, and Visa (EMV) chips) that more securely and efficiently manage card and customer information. While the chips provide several advantages to customers, they can increase the complexity and cost of transaction card manufacturing.

For example, manufacturing a transaction card that includes an electronic component (such as an EMV chip) may include additional steps to create space(s) for the component and steps to secure the component within the space(s). Often, a process known as milling and embedding is used. In this process, a computer numerical control (CNC) machine is used to mill away a space, called a pocket, of a desired size for accommodating or receiving an electronic component (e.g., an EMV chip). The term "pocket" refers to a recessed portion of a structure and may include a base portion, one or more walls projecting from the base portion, and an opening formed by the one or more walls. The term "pocket" may also refer to a cavity, a hole, or a container. The component is then embedded or secured into the space (i.e., pocket) using a hot press adhesive. The milling and embedding processes are typically performed together in an in-line machine.

In addition, as transaction cards increase in prevalence, expectations for transaction card quality have increased. Transaction cards have increasingly been made to meet higher standards regarding materials, manufacturing tolerances, and overall "fit and finish." Accordingly, tolerance of defects in transaction cards related to manufacturing processes has decreased over time.

The present disclosure is directed to overcoming one or more of the problems set forth above and/or other problems associated with conventional transaction card construction.

SUMMARY

The disclosed embodiments relate to a process for constructing a transaction card that includes a molded pocket.

Consistent with a disclosed embodiment, a method of manufacturing a transaction card is provided. The method may include forming a transaction card frame within a mold, the transaction card frame including at least one recessed portion within a first surface; and affixing at least one electronic component to an interior of the at least one recessed portion.

Consistent with another disclosed embodiment, a mold for molding a transaction card is provided. The mold may include a first plate and a second plate. The first plate and second plate may be joined together, forming a cavity for receiving a material for forming a transaction card frame. The first plate and the second plate of the mold may include structures that define a shape and dimension of at least one recessed portion to be formed within a first surface of the transaction card frame, the at least one recessed portion configured for affixing at least one electronic component.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include apparatuses and methods for manufacturing a transaction card. For example, disclosed embodiments include a mold for injection molding or compression molding of a transaction card frame including a pocket (or a recessed portion) to accommodate (or receive, affix) an electronic component. Various methods may be used to manufacture the transaction card frame out of different types of materials that are suitable for satisfying certain criteria or preferences. In addition, the disclosed embodiments may reduce costs or complexity of card manufacturing when compared to traditional processes.

The term "transaction card," as used herein, may refer to any physical card product that is configured to provide information, such as financial information (e.g., card numbers, account numbers, etc.), quasi-financial information (e.g., rewards balance, discount information, etc.) and/or individual-identifying information (e.g., name, address, etc.), when the card is read by a card reader. Examples of transaction cards include credit cards, debit cards, gift cards, rewards cards, frequent flyer cards, merchant-specific cards, discount cards, identification cards, and driver's licenses, but are not limited thereto.

Transaction cards may be flat objects configured to slide through a card reader, inserted into a card reading slot, or otherwise physically interact with a card reading device. Cards may be manufactured to size tolerances intended to allow the cards to slide through, fit inside, or otherwise physically interact with such a device. For example, a transaction card may be manufactured to conform to the ISO/IEC 7810 ID-1 standard, and have dimensions of 85.60 mm×53.98 mm×0.76 mm. This standard is merely exemplary, as other standards may be used, and some cards may deviate from a standard in such a way that they may still properly interact with certain card reading devices.

Figure 1:
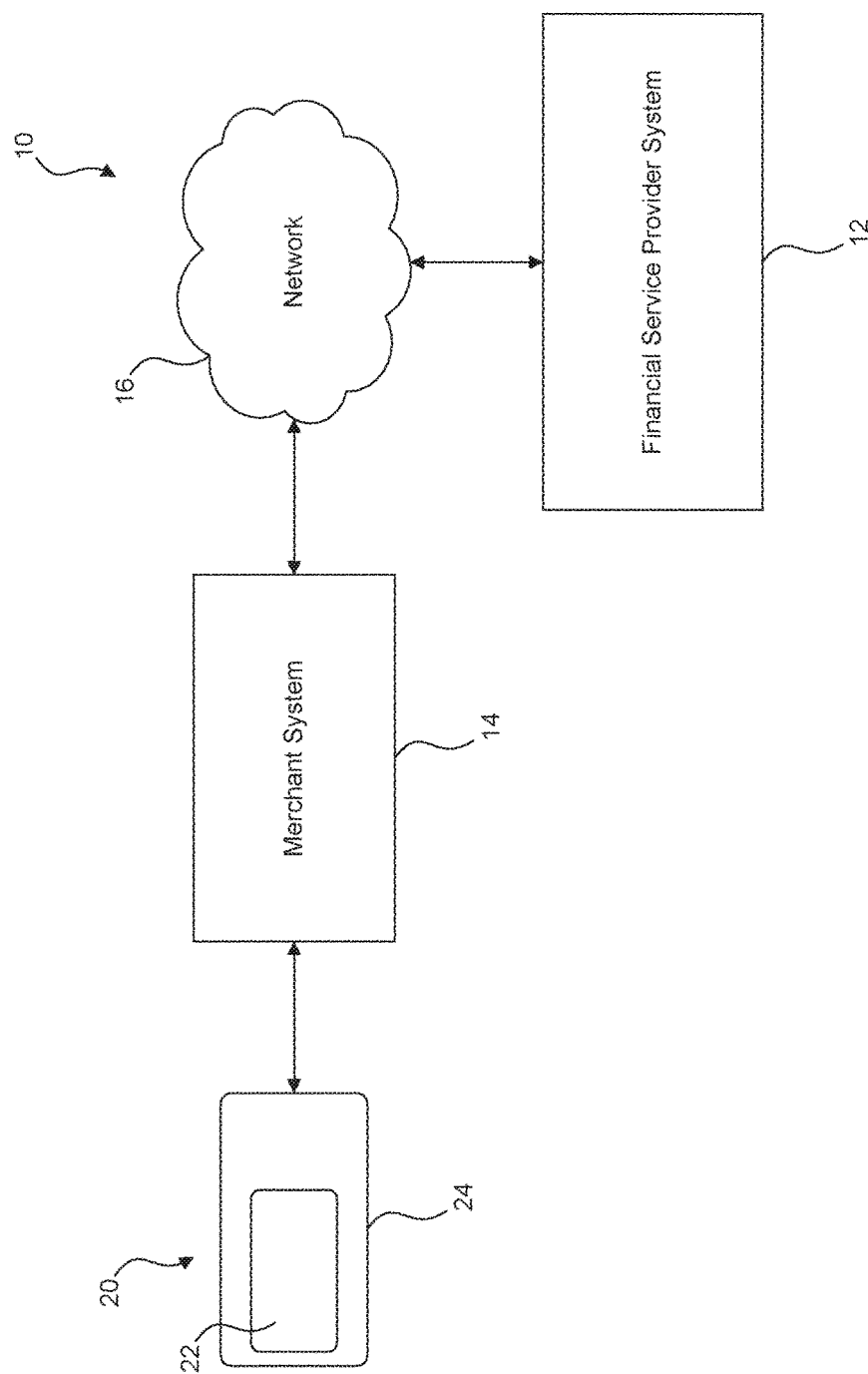
FIG. 1 is a block diagram of an exemplary transaction system, consistent with disclosed embodiments.

FIG. 1 illustrates an exemplary transaction system 10. Transaction system 10 may include a computing system configured to receive and send information between the components of transaction system 10 and with components outside of transaction system 10. Transaction system 10 may include a financial service provider system 12 and a merchant system 14 communicating with each other through a network 16. Transaction system 10 may include additional and/or alternative components.

Financial service provider system 12 may include one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service accounts. Financial service accounts may be associated with physical financial service transaction cards, such as credit or debit cards that customers use to perform financial service transactions, such as purchasing goods and/or services online or at a point of sale (POS) terminal. Financial service accounts may also be associated with electronic financial products and services, such as a digital wallet or similar account that may be used to perform electronic transactions, such as purchasing goods and/or services online.

Merchant system 14 may include one or more computer systems associated with a merchant. For example, merchant system 14 may be associated with an entity that provides goods and/or services (e.g., a retail store). The merchant may include brick-and-mortar location(s) that a customer may physically visit and purchase goods and services using the transaction cards. Such physical locations may include computing devices (e.g., merchant system 14) that perform financial service transactions with customers (e.g., POS terminal(s), kiosks, etc.). Additionally or alternatively, merchant system 14 may be associated with a merchant who provides an electronic shopping environment, such as a website or other online platforms that consumers may access using a computer through browser software, a mobile application, or similar software. Merchant system 14 may include a client device, such as a laptop computer, desktop computer, smart phone, or tablet, which a customer may operate to access the electronic shopping mechanism.

Network 16 may include any type of network configured to facilitate communications and data exchange between components of transaction system 10, such as, for example, financial service provider system 12 and merchant system 14. Network 16 may include a Local Area Network (LAN) or a Wide Area Network (WAN), such as the Internet. Network 16 may be a single network or a combination of networks. Network 16 is not limited to the above examples and transaction system 10 may implement any type of network that allows entities (shown and not shown) of transaction system 10 to exchange data and information.

Transaction system 10 may be configured to conduct a transaction using a transaction card 20. In some embodiments, financial service provider system 12 may provide transaction card 20 to a customer for use in conducting transactions associated with a financial service account held by the customer. For example, the customer may use transaction card 20 at a merchant location to make a purchase. During the course of the purchase, information may be transferred from transaction card 20 to merchant system 14 (e.g., a point of sale device). Merchant system 14 may communicate with financial service provider system 12 via network 16 to verify the information and to complete or deny the transaction. For example, merchant system 14 may receive account information from transaction card 20. Merchant system 14 may transmit the account information and a purchase amount, among other transaction information, to financial service provider system 12. Financial service provider system 12 may settle the transaction by transferring funds from the customer's financial service account to a financial service account associated with the merchant.

While transaction system 10 and transaction card 20 are depicted and described in relation to transactions that involve customers, merchants, and financial service providers, it should be understood that the these entities are used only as an example to illustrate one environment in which transaction card 20 may be used. Transaction card 20 is not limited to financial products and may be any physical card product that is configured to provide information to another device when read by a card reader. For example, transaction card 20 may be an identification card configured to provide information to a device in order to identify the holder of the card (e.g., driver's license).

In some embodiments, transaction card 20 may further include an electronic component 22. As used herein, an "electronic component" may be one or more devices and/or elements configured to receive, store, process, provide, transfer, send, delete, and/or generate information. For example, electronic component 22 may be a microchip (e.g., EMV chip), a communication device (e.g., Near Field Communication (NFC) antenna, Bluetooth® device, WiFi device), a magnetic strip, a barcode, Quick Response (QR) code, etc. Electronic component 22 may be secured (or affixed, attached) to a transaction card frame 24 (or card frame 24) in such a way that allows card frame 24 to carry electronic component 22 while maintaining a utility of electronic component 22 (i.e., allowing electronic component 22 to interact with merchant system 14).

Figure 2A:
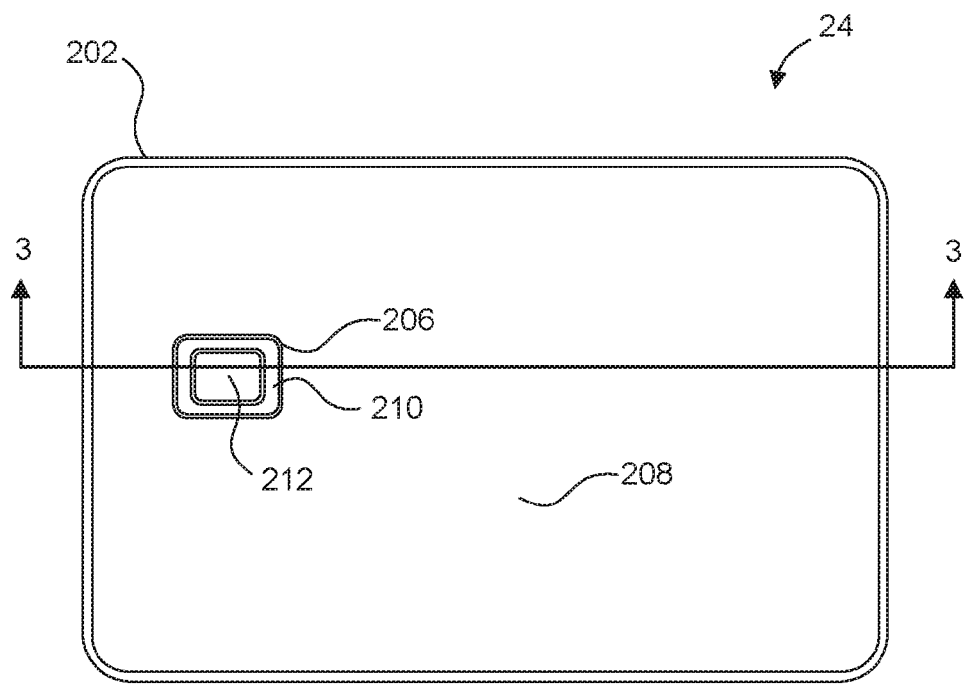
FIG. 2A is a front view of an exemplary transaction card frame, consistent with disclosed embodiments.
Figure 2B:
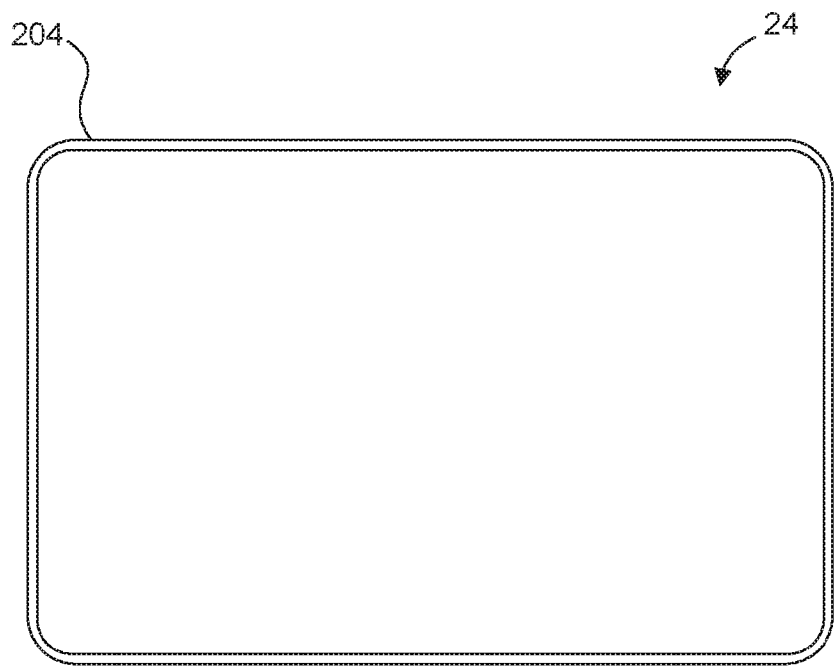
FIG. 2B is a back view of an exemplary transaction card frame, consistent with disclosed embodiments.

FIG. 2A is a front view of an exemplary transaction card frame 24. FIG. 2B is a rear view of the card frame 24. FIG. 2A shows a front side 202 of card frame 24 and FIG. 2B shows a rear side 204 of card frame 24. As shown in FIG. 2A, card frame 24 includes a pocket 206 configured to accommodate (or receive, affix, or secure) electronic component 22. Pocket 206 may include features that accommodate a particular geometry of electronic component 22 or enable electronic component 22 to be fixed (or secured, affixed, attached, or embedded) to card frame 24.

Card frame 24 may include an upper surface 208 (or first surface 208). Pocket 206 may include a second surface 210 recessed a first depth from first surface 208 of card frame 24. Pocket 206 may also include a third surface 212. Third surface 212 may be recessed a second depth from first surface 208. The second depth may be greater than the first depth. That is, third surface 212 may form a base portion of pocket 206, and second surface 210 may form an elevated surface at a certain height above third surface 212. The dimensions and depths of second surface 210 and third surface 212 may be set based on a plurality of criteria such as the size of a particular electronic component, industry standards, manufacturing tolerances, or other considerations. Based on the geometry of the electronic component to be embedded in pocket 206, pocket 206 may include fewer (e.g., one) or more (e.g., three, four, etc.) surfaces recessed from first surface 208.

For example, in some embodiments, pocket 206 may be configured to accommodate a microchip, such as an EMV chip. In these embodiments, first surface 208 may be referred to as P0. Second surface 210 may be referred to as P1 and used as a glue layer for a contact plate of the EMV chip. Third surface 212 may be referred to as P2 and used as a deeper pocket to accommodate the depth of the EMV chip itself.

Figure 3:
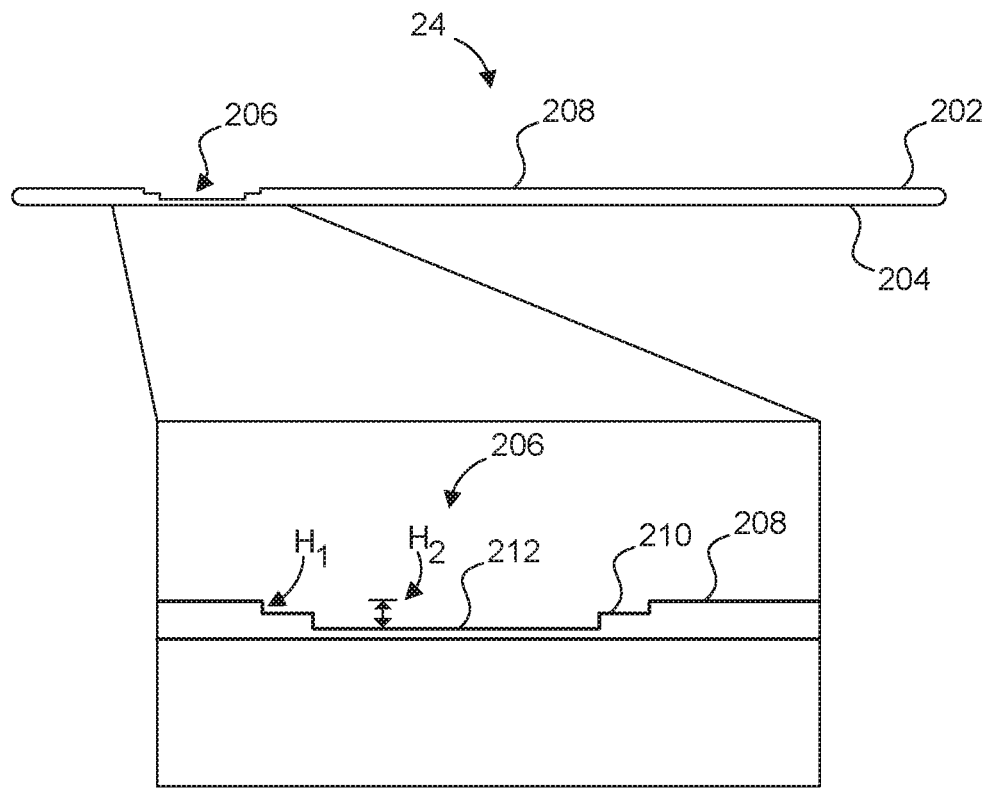
FIG. 3 is a cross-sectional view of the exemplary transaction card frame FIG. 2A taken along line 3-3, consistent with disclosed embodiments.

FIG. 3 illustrates a cross-sectional view of an exemplary embodiment of card frame 24 shown in FIG. 2 taken along line 3-3. FIG. 3 includes a magnified view of pocket 206 which illustrates surfaces 208, 210, and 212. As shown in the magnified view of pocket 206, second surface 210 is recessed a first depth H1 from first surface 208, and third surface 212 is recessed a second depth H2 from first surface 208. The dimensions (e.g., widths and heights or depths) of surfaces 208, 210, and 212 may vary based on the dimensions of the electronic component. For example, in some embodiments, first depth H1 may be 0.21 mm (with an error tolerance of +/−0.02 mm), and second depth H2 may be 0.62 mm (with an error tolerance of +/−0.02 mm).

Card frame 24 may be manufactured using a molding process, such as an injection molding process or a compression molding process. Although injection molding is discussed in detail as an example of the molding process, some features discussed below may also be applied to the compression molding process.

During an injection molding process, any material suitable for injection molding, such as thermoplastic and thermosetting polymers, may be used for forming card frame 24. Injection and/or ejection molds used to form card frame 24 may include structures for forming pocket 206 within card frame 24 either without additional milling, or with reduced milling steps than required by conventional transaction card manufacturing processes.

Figure 4A:
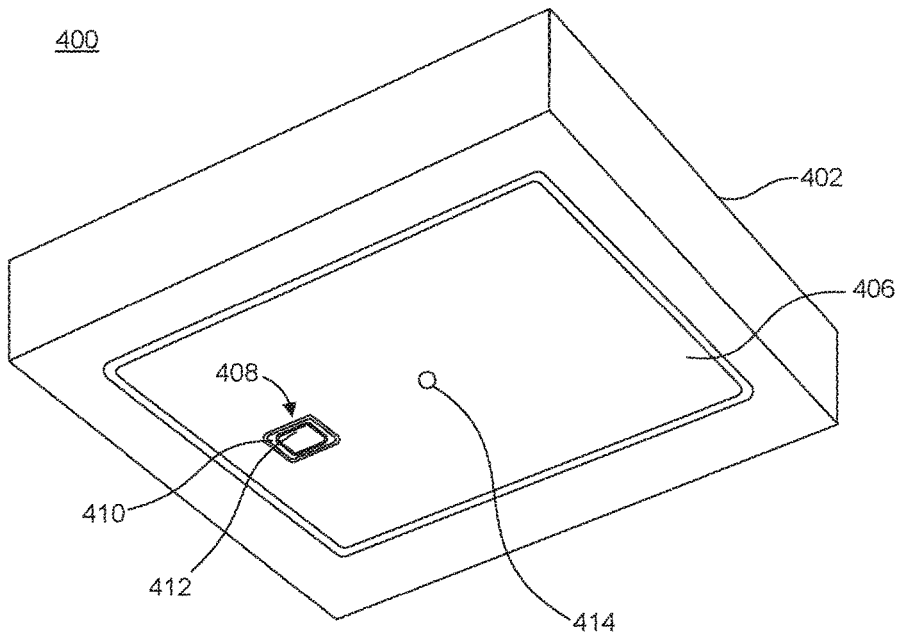
FIG. 4A is a schematic perspective view of a first plate of an exemplary mold for producing transaction card frames, consistent with disclosed embodiments.
Figure 4B:
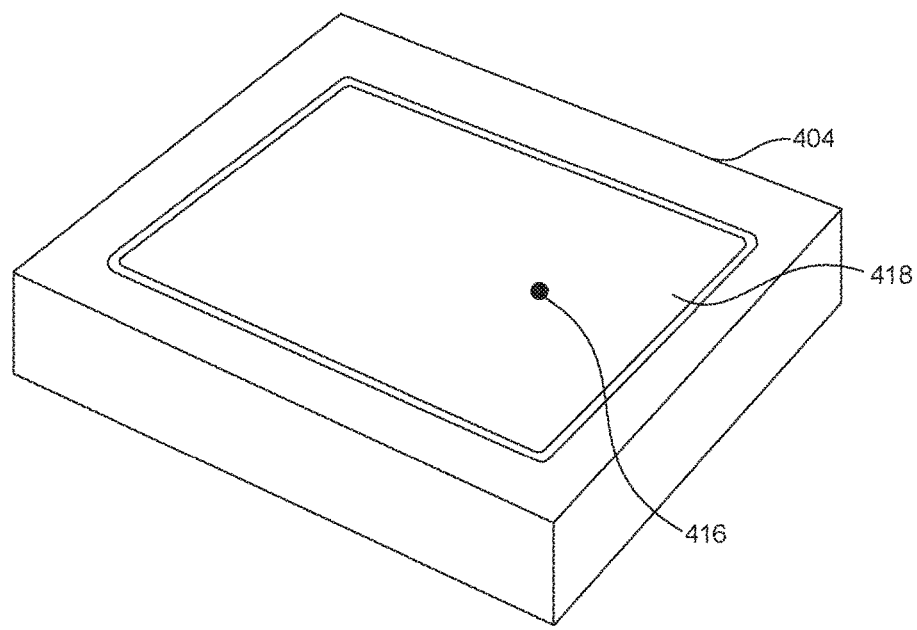
FIG. 4B is a schematic perspective view of a second plate of an exemplary mold for producing transaction card frames, consistent with disclosed embodiments.

FIG. 4A is a schematic perspective view of a first plate 402 (or first component) of an exemplary mold 400 for manufacturing card frame 24, and FIG. 4B is a schematic perspective view of a second plate 404 (or second component) of mold 400. Mold 400 may be constructed of any material or materials suitable for use as an injection or compression mold, such as various grades of steel or aluminum. First plate 402 includes a surface 406 that defines surface 208 of card frame 24. In some embodiments, surface 406 is substantially flat. Surface 406 may include a protrusion structure 408 protruding from the rest of surface 406. Protrusion structure 408 defines the shape and dimension of pocket 206. For example, protrusion structure 408 may include a first protrusion portion 410 (also shown in FIG. 5B) protruding a first distance from surface 406. The first distance may be substantially the same as the first depth H1 shown in FIG. 3. The first protrusion portion 410 defines second surface 210 of pocket 206. Protrusion structure 408 may include a second protrusion portion 412 (also shown in FIG. 5B) protruding a second distance from surface 406. The second distance may be greater than the first distance. The second distance may be substantially the same as the second depth H2 shown in FIG. 3. The second protrusion portion 412 defines third surface 212 of pocket 206.

First plate 402 may include a gate 414 formed on surface 406. Gate 414 is an opening on surface 406, and is configured to receive a material for forming card frame 24 during the injection molding process. Gate 414 may be connected with a channel 504 (shown in FIG. 5B) extending throughout the thickness of first plate 402. Second plate 404 may include a through hole for receiving a pin 416. Second plate 402 may include a surface 418. Surface 418 may include a shape corresponding to rear side 204 of card frame 24 and may define rear side 204.

Figure 5A:
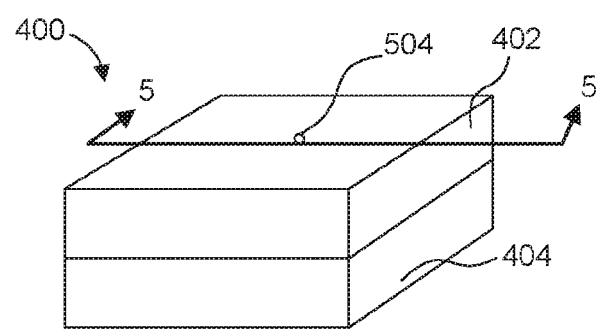
FIG. 5A is a perspective view of the first plate and the second plate of the exemplary mold shown in FIGS. 4A and 4B stacked together, consistent with disclosed embodiments.
Figure 5B:
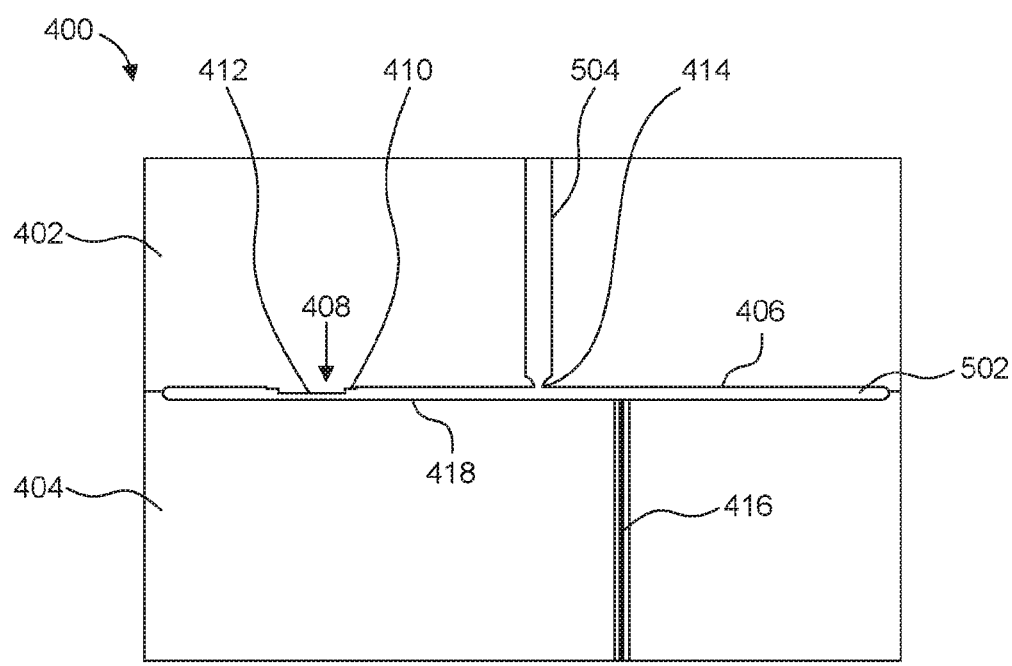
FIG. 5B is a cross-sectional view of the exemplary mold of FIG. 5A taken along line 5-5, consistent with disclosed embodiments.

FIG. 5A is a perspective view of first plate 402 and second plate 404 of mold 400 shown in FIGS. 4A and 4B stacked or joined together. FIG. 5B is a cross-sectional view of mold 400 of FIG. 5A taken along line 5-5. As shown in FIG. 5B, when the first plate 402 and second plate 404 are joined together, surface 406 and surface 418 define a space or cavity 502 for receiving a material for forming card frame 24 during an injection molding process. Cavity 502 has substantially the same three-dimensional shape and dimensions as card frame 24. As shown in FIG. 5B, protrusion structure 408 and surface 418 defines the shape and dimension of pocket 206.

As shown in FIG. 5B, gate 414 may be connected with channel 504 for receiving a material for constructing or forming card frame 24 during a molding process. Pin 416 is accommodated within a through hole formed within second plate 404. Pin 416 may be configured for releasing molded card frame 24 from mold 400. During manufacturing, a material for constructing card frame 24 may be heated and injected through channel 504 and gate 414 such that the material fills cavity 502, thereby forming card frame 24 including pocket 206 that includes one or more surfaces recessed from first surface 208. In some embodiments, the surfaces included in pocket 206 recessed from first surface 208 may be formed during the same molding process using the same mold. Mold 400 may then be cooled to harden the material. First plate 402 and second plate 404 may be separated and pin 416 may be extended into the through hole formed in second plate 404 to separate the hardened material of card frame 24 from second plate 404.

In some embodiments, one or more surfaces of pocket 206 may be formed by a molding process, and one or more surfaces of pocket 206 may be formed by a milling process. For example, surface 210 may be formed by molding, whereas surface 212 may be formed by milling. Alternatively, surface 210 may be formed by milling, whereas surface 212 may be formed by molding.

In some embodiments an electronic component may be added to pocket 206 without additional milling. As an example, mold 400 may produce card frame 24 of appropriate dimensions such that an EMV chip may be affixed within pocket 206 as a next step in a transaction card manufacturing process after removing card frame 24 from mold 400.

In other embodiments, after separating card frame 24 from mold 400, further steps may be performed on card frame 24. For example, undesired or excessive materials may be milled away from the interior of the recessed portion. In some embodiments, gate 414 may leave marks on card frame 24 as a result of separating hardened material left in channel 504 from card frame 24. Further, material may seep into margins between an ejection pin and one or more of the surfaces of mold 400, resulting in marks on a surface of card frame 24. Marks such as those left by a gate or ejection pin are often viewed as undesirable defects. Such defects may be minor such that they are considered acceptable or imperceptible or alternatively may be removed by corrective steps such as sanding, buffing, grinding, or milling.

In some embodiments, components of mold 400 may be arranged to allow steps for removing defects to be combined with other steps involved in manufacturing transaction card 20. For example gates and/or ejection pins may be located strategically such that any marks that may be left on card frame 24 may be covered by a component later affixed to card frame 24, painted or printed over, or removed in a subsequent milling step. This principle is illustrated in further detail in FIGS. 6-9.

Figure 6A:
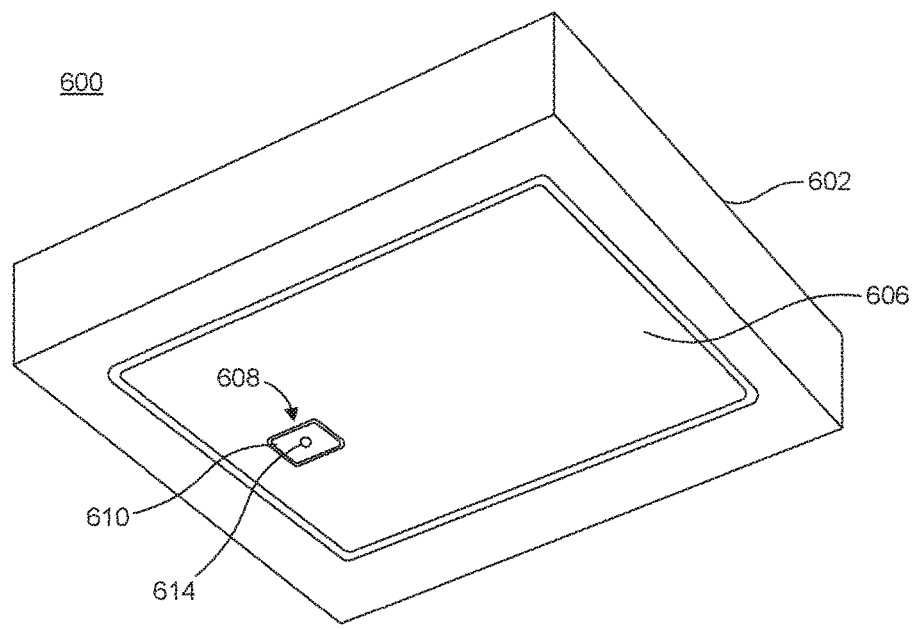
FIG. 6A is a perspective view of a first plate of an exemplary mold for producing transaction card frames, consistent with disclosed embodiments.
Figure 6B:
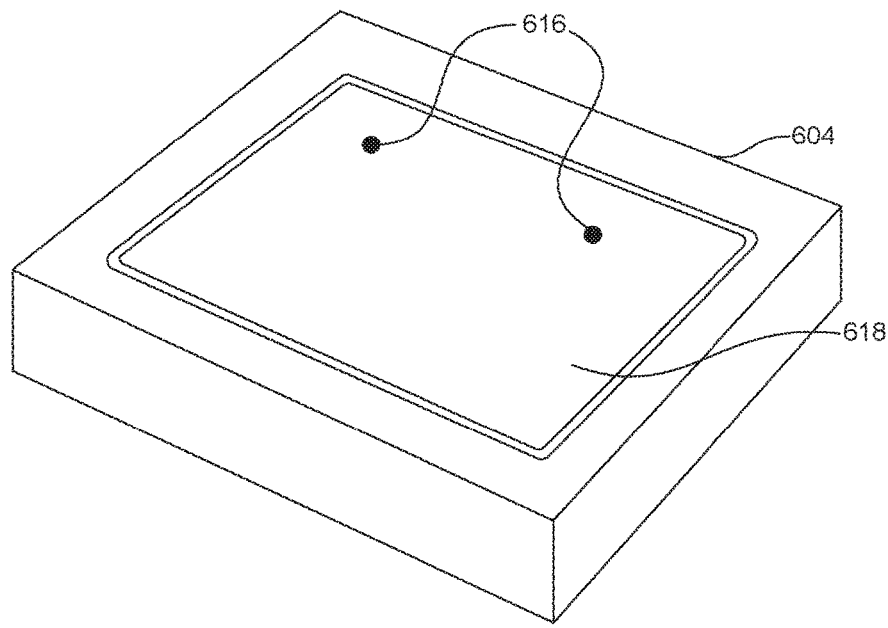
FIG. 6B is perspective view of a second plate of an exemplary mold for producing transaction card frames, consistent with disclosed embodiments.

FIG. 6A is a perspective view of a first plate 602 of an exemplary mold 600 for producing transaction card frames. FIG. 6B is a perspective view of a second plate 604 of mold 600. Mold 600 may include structures and functions similar to mold 400, and may be used in the same or similar process for forming card frame 24 as discussed above in connection with mold 400. First plate 602 and second plate 604 may include structures similar to those of mold 400, except for the location of the gate and pins. Similar to mold 400, mold 600 may include first surface 606 configured to define first surface 208 of card frame 24. First surface 606 may include a protrusion structure 608, which may be similar to protrusion structure 408, configured for defining the shape and dimension of pocket 206. For example, protrusion structure 608 may include a protrusion portion 610 for defining a recessed surface (e.g., surface 212) in pocket 206. Additional protrusion portions, such as one similar to protrusion portion 412, may also be included in protrusion structure 608. Second plate 604 may include a surface 618, which may be similar to surface 418 of second plate 404.

As shown in FIG. 6A, first plate may include a gate 614 disposed at a suitable portion of protrusion structure 608, which defines pocket 206. For example, gate 614 may be disposed at a surface of protrusion portion 610 of protrusion structure 608, which may define a base portion or surface (e.g., surface 212) of pocket 206. Gate 614 may be disposed such that an undesired mark left by gate 614 during manufacturing may be removed or hidden by the installation of electronic component 22. Thus, any location on protrusion structure 608 that corresponds to a location within an interior of pocket 206 may be suitable for gate 614, if a mark left at the gate 614 will be hidden by the electronic component 22 after the electronic component 22 is installed or embedded within pocket 206.

As shown in FIG. 6B, second plate 604 may include a surface 618, which may be similar to surface 418 of mold 400. Second plate 604 may include two through holes for receiving two pins 616. The pins may be used for ejecting card frame 24 after the material for forming card frame 24 has been hardened. Fewer or additional through holes may be included in second plate 604. The locations of the through holes may be different from the location of the through hole included in second plate 404.

Figure 7A:
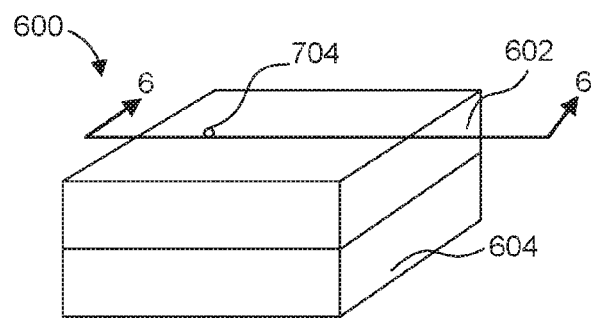
FIG. 7A is a perspective view of the first plate and the second plate of the exemplary mold shown in FIGS. 6A and 6B stacked together, consistent with disclosed embodiments.
Figure 7B:
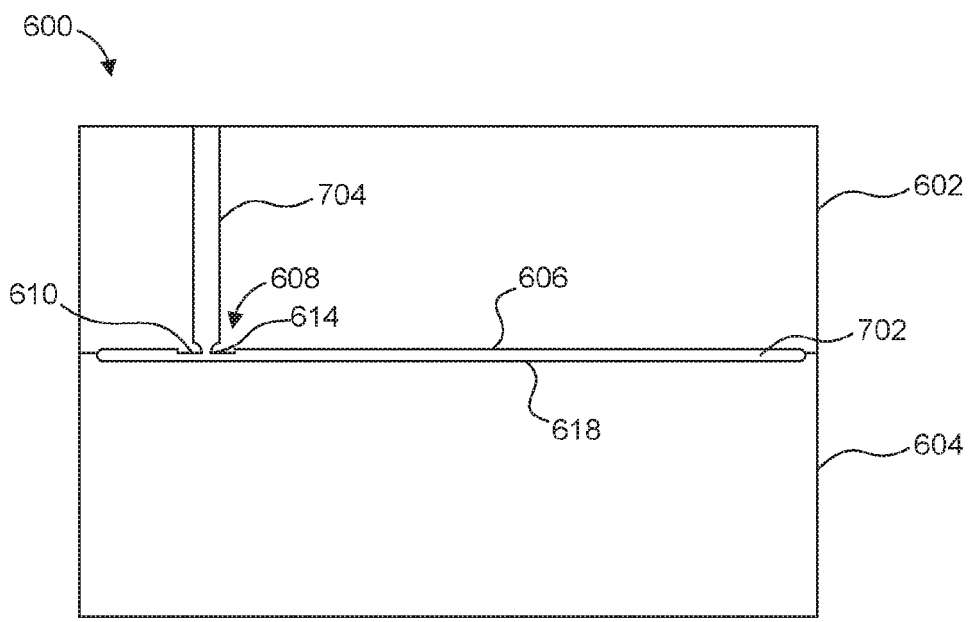
FIG. 7B is a cross-sectional view of the exemplary mold of FIG. 7A taken along line 6-6, consistent with disclosed embodiments.

FIG. 7A is a perspective view of first plate 602 and second plate 604 shown in FIGS. 6A and 6B joined together to form mold 600. FIG. 7B is a cross-sectional view of mold 600 shown in FIG. 7A taken along line 6-6. As shown in FIG. 7B, when joined together, surface 606 and surface 618 may form a space or cavity 702 for receiving a material for forming card frame 24 during an injection molding process. Cavity 702 may have substantially the same three-dimensional shape and dimensions as card frame 24. Protrusion structure 608 and surface 618 define the shape and dimension of pocket 206. During manufacturing, a material for constructing card frame 24 may be heated and injected through channel 704 and gate 614, similar to the process described above in relation to FIGS. 4A-5B.

Upon separation of plates 602 and 604, gate 614 may leave a mark on a surface (e.g., surface 212) of card frame 24. However, the gate mark may be covered by the installation of an electronic component into pocket 206. Alternatively, the gate mark and an area surrounding the gate mark may be removed by, for example, milling or cutting. This may be achieved, for example, during a process for creating a surface (e.g., surface 210 or 212) on the resulting card frame 24. Thus, the steps of removing the gate mark and forming a specified surface to accommodate an electronic component may be combined.

Referring back to FIG. 6B, pins 616 may leave marks on card frame 24. However, in some embodiments, pins 616 may be disposed such that the resulting marks may be eliminated by the application of a component, to transaction card 20. For example, a magnetic strip may be applied onto card frame 24 at a location that covers the marks. Alternatively, a recessed surface may be, for example, cut or milled into the surface of card frame 24 prior to application of a magnetic strip. The step of adding the recessed surface may also remove the marks left by pins 616.

Figure 8A:
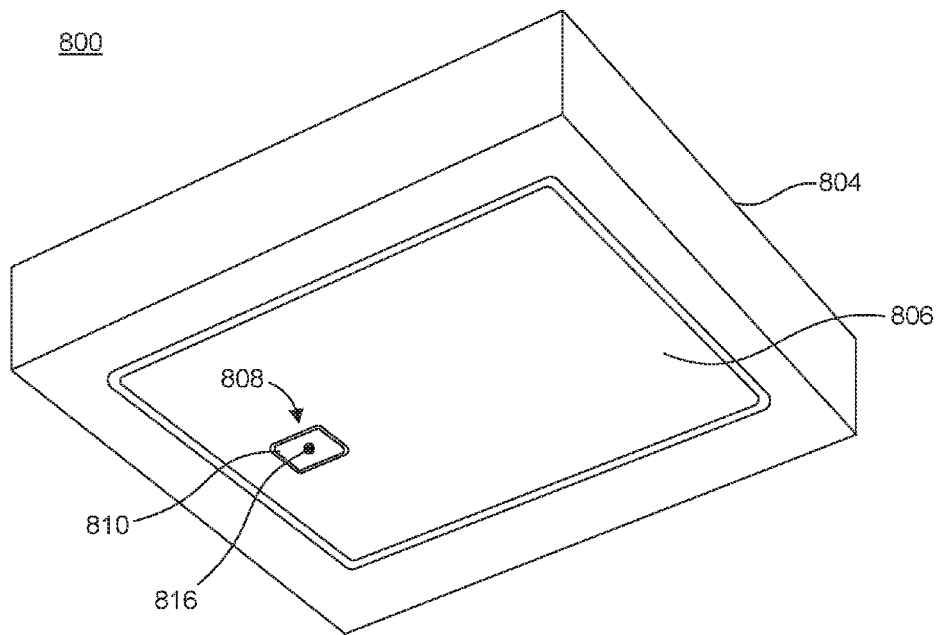
FIG. 8A is a perspective view of a first plate of an exemplary mold for producing transaction card frames, consistent with disclosed embodiments.
Figure 8B:
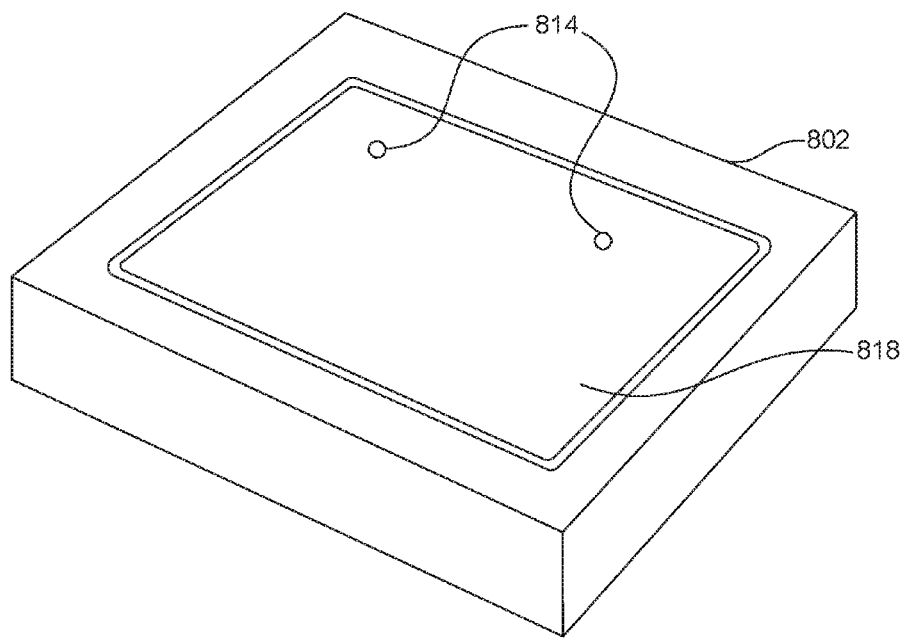
FIG. 8B is a perspective view of a second plate of an exemplary mold for producing transaction card frames, consistent with disclosed embodiments.

FIG. 8A is a perspective view of a first plate 804 of an exemplary mold 800 for producing transaction card frames. FIG. 8B is a perspective view of a second plate 802 of mold 800. Mold 800 may include structures and functions similar to mold 400 or mold 600, and may be used in the same or similar process for forming card frame 24 as discussed above in connection with mold 400 or 600. Different features included in molds 400, 600, and 800 may be combined.

First plate 804 may include a surface 806 that defines a shape of first surface 208 of card frame 24. Similar to surfaces 406 and 606 shown in FIGS. 4A and 6A, surface 806 may include a protrusion structure 808 protruding from the rest of surface 806. Protrusion structure 808 may include one or more protrusion portions that define the shape and dimension of pocket 206. For example, protrusion structure 808 may include a protrusion portion 810 that defines a surface (e.g., surface 212) of pocket 206. First plate 804 may include a through hole for receiving a pin 816 for ejecting finished card frame 24. The through hole may be disposed at any suitable location on a surface of protrusion structure 808, such as on a surface of protrusion portion 810, which corresponds to an interior of pocket 206 to be formed. In this way, any mark left by pin 816 may be hidden when an electronic component is installed or embedded within pocket 206. After card frame 24 is formed in an injection molding process, pin 816 may be extended into the through hole located at a location corresponding to the interior of the recessed portion to release the card frame from the mold.

As shown in FIG. 8B, second plate 802 may include a surface 818, which may be similar to surface 418 and 618. Surface 818 may be configured for defining rear side 204 of card frame 24. Surface 818 may include one or more gates 814. Similar to gates 414 and 614, gates 814 may be connected with one or more channels (not shown in FIG. 8B) for receiving a material for forming card frame 24. Gates 814 may be disposed in line with pin 816, or may be disposed at locations that are not in line with pin 816.

Figure 9A:
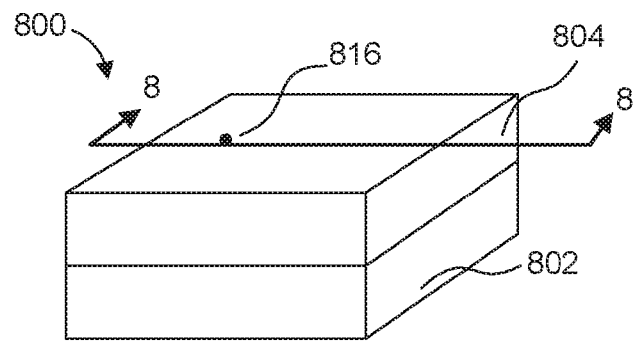
FIG. 9A is a perspective view of the first plate and the second plate of the exemplary mold shown in FIGS. 8A and 8B stacked together, consistent with disclosed embodiments.
Figure 9B:
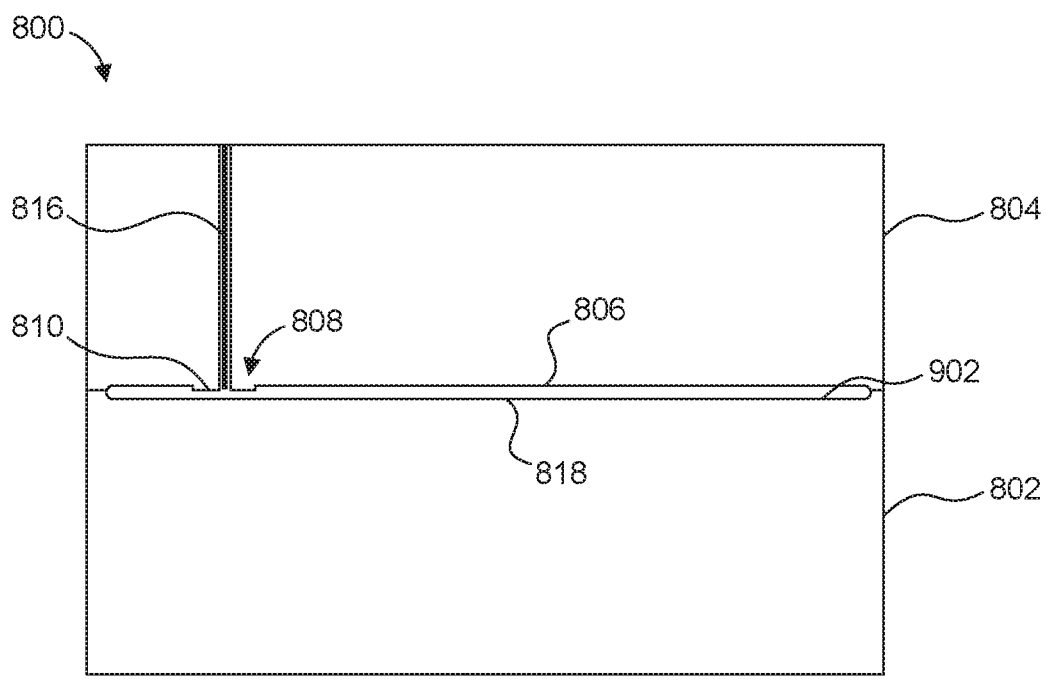
FIG. 9B is a cross-sectional view of the exemplary mold of FIG. 9A taken along line 8-8, consistent with disclosed embodiments.

FIG. 9A is a perspective view of the first plate 804 and the second plate 802 of mold 800 shown in FIGS. 8A and 8B stacked or joined together. FIG. 9B is a cross-sectional view of mold 800 of FIG. 9A taken along line 8-8. As shown in FIG. 9B, when joined together, surfaces 806 and 818 define a space or cavity 902 configured to receive a material for forming card frame 24 during an injection molding process. The cavity 902 has substantially the same shape and dimensions as card frame 24. Protrusion structure 808 and surface 818 define the shape and dimension of pocket 206. Pin 816 is disposed within a through hole that includes an opening on a surface of protrusion portion 810 at a location corresponding to pocket 206. Any mark left by pin 816 may be covered by electronic component 22 when electronic component 22 is installed or embedded within pocket 206. Gates 814 and channels are not shown in the cross-sectional view in FIG. 9B, because they are not located in line with pin 816 (or the through hole for receiving the pin).

Referring back to FIG. 8B, a material for constructing card frame 24 may be heated and injected through gates 814, similar to the process described above. Upon separation of plates 802 and 804, pin 816 may leave a mark on a surface (e.g., surface 212) of card frame 24. The mark may be removed using the steps described above, or the mark may be hidden by the installation of an electronic component into pocket 206. In addition, gates 814 may leave marks on a surface (e.g. surface 208) of card frame 24. An area surrounding these marks may be removed to create an additional surface on the resulting card frame 24, for example, for installing a magnetic strip, thereby removing the marks.

While illustrative embodiments have been described herein, the scope includes any and all embodiments having equivalent elements, modifications, omissions, combinations (e.g., of aspects across various embodiments), adaptations or alterations based on the present disclosure. For example, in some embodiments, a compression molding process may be used to form card frame 24 instead of an injection molding process. In such embodiments, injection gates, such as gates 414, 614, and 814, may not be included in mold 400. Instead, material for forming card frame 24 may be placed in mold 400 and compressed to conform to the shape of a cavity of the mold (e.g., cavity 502, 702, 902, etc.). In the compression molding process, pocket 206 may be formed by corresponding structures on the mold, and may not require milling during the formation of pocket 206.

Figure 10:
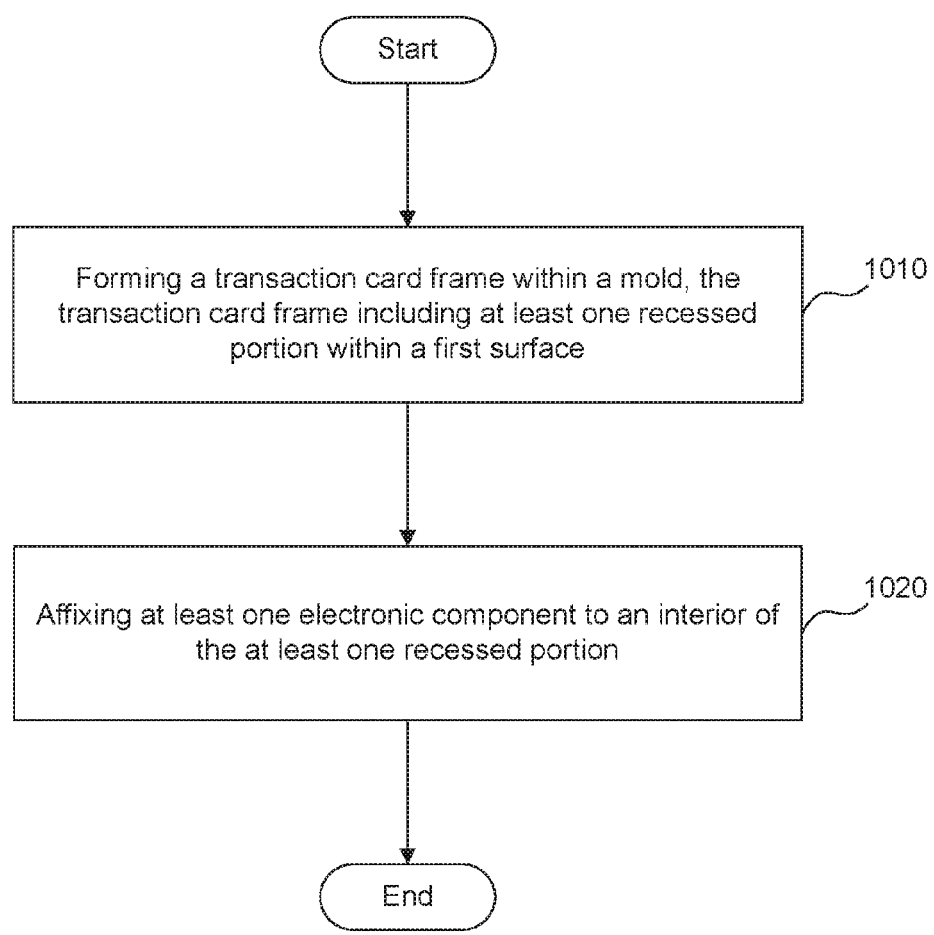
FIG. 10 is a flowchart showing an exemplary method for forming a transaction card, consistent with the disclosed embodiments.

FIG. 10 is a flowchart showing an exemplary method 1000 for forming a transaction card. Method 1000 may include forming a transaction card frame within a mold, the transaction card frame including at least one recessed portion within a first surface (step 1010). The mold may be any of mold 400, 600, and 800 disclosed above. In some embodiments, forming the transaction card frame within the mold may include injection molding the transaction card frame using any of mold 400, 600, or 800. Injection molding the transaction card frame using the mold may include injecting a material for forming the transaction card frame through a gate disposed in the mold at a location corresponding to the at least one recessed portion. In some embodiments, forming the transaction card frame within the mold may include compression molding the transaction card frame within the mold. The mold may include a structure for molding the at least one recessed portion within the first surface of the transaction card frame, and forming the transaction card frame within the mold may include forming the at least one recessed portion within the mold for affixing the at least one electronic component.

In some embodiments, forming the at least one recessed portion within the mold for affixing the at least one electronic component does not involve milling to form the at least one recessed portion.

Method 1000 may also include affixing at least one electronic component to an interior of the at least one recessed portion (step 1020). The electronic component may be affixed to the interior of the recessed portion using any suitable methods, such as adhering using an adhesive, press fitting, screwing, clamping, etc.

The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A method of manufacturing a transaction card, the method comprising:
    forming a transaction card frame within a mold, the transaction card frame including:
        a front side having a first surface;
        a rear side opposite the front side; and
        a recessed portion within the first surface, the recessed portion configured for affixing one or more electronic components and having a second surface recessed a first depth from the first surface;
wherein forming the transaction card includes:
filling a cavity in the mold with heated material;
cooling the mold;
removing the card from the mold by driving a pin through a through hole disposed in the mold to release the card frame from the mold, wherein a mark is left in the recessed portion by the pin;
removing the mark from the recessed portion during the formation of the second surface; and
installing an electronic component into the recessed portion.

2. The method of claim 1, the recessed portion further having a third surface at a second depth from the first surface.

3. The method of claim 2, wherein the second and third surfaces are formed by removing material using a milling operation.

4. The method of claim 2, wherein the second depth is greater than the first depth.

5. The method of claim 2, wherein the first depth is greater than the second depth.

6. The method of claim 2, wherein the first depth is 0.19-0.23 mm, and the second depth is 0.60-0.64 mm.

7. The method of claim 1, wherein forming the transaction card frame within the mold comprises injection molding the transaction card frame within the mold using a thermoplastic or a thermosetting polymer.

8. The method of claim 2, wherein the second and third surfaces are both formed within the mold.

9. The method of claim 1, wherein the mold is constructed of steel or aluminum.

10. The method of claim 1, further including:
injecting the heated material into the mold via a channel and a gate disposed within the mold, the mold including two separable plates;
separating the two plates; and
removing excess material left on the card frame by the gate.

11. The method of claim 10, wherein removing the excess material includes a sanding, buffing, grinding, or milling operation.

12. The method of claim 1, further including:
injecting the heated material into the mold via a gate disposed within the mold,
the mold including two separable plates, wherein a mark is left on the rear side of the card frame by the gate;
separating the two plates; and
removing the mark left on the rear side of the card frame by the gate while forming a third surface on the rear side of the card.

13. The method of claim 12, further including:
installing a second electronic component on the third surface.

14. The method of claim 13, wherein the second electronic component is a magnetic strip.

15. The method of claim 14, wherein the second electronic component is an EMV chip.

16. The method of claim 1, further including:
injecting the heated material into the mold via a gate disposed within the mold,
the mold including two separable plates, wherein a mark is left on the rear side of the card frame by the gate;
separating the two plates; and
covering the mark left on the rear side card frame by applying a second electronic component to the rear side of the card frame.

17. The method of claim 16, wherein the second electronic component is a magnetic strip.

18. The method of claim 16, wherein the second electronic component is an EMV chip.

19. The method of claim 1, wherein the electronic component is an EMV chip.

20. The method of claim 1, wherein the installing the electronic component into the recessed portion comprises use of an adhesive, a press fitting, a screw, or a clamp.

21. The method of claim 1, wherein the mold includes a first plate, a second plate, a channel extending through a thickness of the first plate, and a gate connected to the channel, the method further comprising:
joining the first and second plates to define the cavity within the mold;
filling the cavity by injecting the heated material through the channel and the gate;
separating the first and second plates; and
removing excess material left on the card frame by the channel, pin, through hole, or gate.

* * * * *

UNITED STATES PATENT AND TRADEMARK OFFICE
CERTIFICATE OF CORRECTION

PATENT NO. : 10,207,436 B2
APPLICATION NO. : 15/870936
DATED : February 19, 2019
INVENTOR(S) : Cepress et al.

Page 1 of 1

It is certified that error appears in the above-identified patent and that said Letters Patent is hereby corrected as shown below:

In the Claims

Claim 21, Column 12, Line 45, "by the channel, pin, through hole, or gate" should read as --by the channel, through hole, or gate--

Signed and Sealed this
Twenty-first Day of May, 2019

Andrei Iancu
*Director of the United States Patent and Trademark Office*